United States Patent
Copty et al.

(10) Patent No.: US 8,140,457 B2
(45) Date of Patent: Mar. 20, 2012

(54) DETERMINING COMPLIANCE RATES FOR PROBABILISTIC REQUESTS

(75) Inventors: Shady Copty, Nazareth (IL); Roy Emek, Tel Aviv (IL); Itai Jaeger, Lavon (IL); Yoav Katz, Haifa (IL); Shai Lubliner, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 911 days.

(21) Appl. No.: 12/169,653

(22) Filed: Jul. 9, 2008

(65) Prior Publication Data

US 2010/0010950 A1    Jan. 14, 2010

(51) Int. Cl.
*G06F 17/00* (2006.01)
*G06N 5/02* (2006.01)

(52) U.S. Cl. ............... 706/46; 706/47; 706/61

(58) Field of Classification Search .......... None
See application file for complete search history.

(56) References Cited

U.S. PATENT DOCUMENTS

| | | | | |
|---|---|---|---|---|
| 6,662,167 | B1* | 12/2003 | Xiao | 706/13 |
| 6,684,359 | B2 | 1/2004 | Noy | |
| 7,266,534 | B2* | 9/2007 | Emek et al. | 706/45 |
| 7,415,444 | B2* | 8/2008 | Copty et al. | 706/17 |
| 2002/0169587 | A1 | 11/2002 | Emek et al. | |
| 2003/0220847 | A1* | 11/2003 | Torrens et al. | 705/27 |
| 2005/0222833 | A1* | 10/2005 | Kropaczek et al. | 703/18 |
| 2007/0156616 | A1* | 7/2007 | Torrens et al. | 706/19 |
| 2007/0179919 | A1* | 8/2007 | Kropaczek et al. | 706/19 |
| 2007/0271207 | A1* | 11/2007 | Copty et al. | 706/21 |
| 2008/0154838 | A1* | 6/2008 | Watford et al. | 706/52 |

OTHER PUBLICATIONS

Timetabling for Greek high schools Birbas, T. (Univ of Patras); Daskalaki, S.; Housos, E. Source: *Journal of the Operational Research Society*, v 48, n 12, Dec. 1997, p. 1191-1200 ISSN: 0160-5682 CODEN: Jorsdz Publisher: Stockton Press.

Weighted constraint aggregation in fuzzy optimization Kaymak, U. (Erasmus University Rotterdam, Faculty of Economics, Department of Computer Science); Sousa, J.M. Source: *Constraints*, v 8, n 1, Jan. 2003, p. 61-78 ISSN: 1383-7133 CODEN: CNSTFT Publisher: Kluwer Academic Publishers.

Multiproduct Aggregate Production Planning with Fuzzy Demands and Fuzzy Capacities Fung, Richard Y. K. (Dept. of Manufacturing Engineering, City University of Hong Kong); Tang, Jiafu; Wang, Dingwei Source: *IEEE Transactions on Systems, Man, and Cybernetics Part A:Systems and Humans.*, v 33, n 3, May 2003, p. 302-313 ISSN: 1083-4427 CODEN: ITSHFX Publisher: Institute of Electrical and Electronics Engineers Inc.

* cited by examiner

*Primary Examiner* — Jeffrey A Gaffin
*Assistant Examiner* — Adrian Kennedy
(74) *Attorney, Agent, or Firm* — Jason Far-Hadian

(57) ABSTRACT

Systems and methods for solving a constraint satisfaction problem (CSP) defined by one or more variables, constraints and probabilistic requests (PRs) are provided. In one embodiment, each PR is mapped onto a set of constraints that implement the PR. The CSP solver then finds a series of solutions to the CSP. For each solution, if a constraint associated with a PR is satisfied, then a success counter for that PR is incremented; else a failure counter for that PR is incremented. If the constraint was not considered for the purpose of solving the CSP, then the failure counter for the PR associated with the constraint is incremented.

20 Claims, 5 Drawing Sheets

DETERMINING COMPLIANCE RATES FOR PROBABILISTIC REQUESTS

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to conformance rates of probabilistic requests defined for a constraint satisfaction problem (CSP) and, more particularly, to systems and methods for determining what percentage of the generated solutions for the CSP comply with the probabilistic requests.

BACKGROUND

Functional verification is the process that ensures conformance of a hardware or software design to its specification. The verification process includes defining a test plan for a set of events that the verification team would like to observe during the verification process. The test plan is usually implemented using random stimuli generators that produce stimuli in the form of test cases.

The stimuli is fed to a simulator that runs the tests on the design under verification. Coverage tools then detect the occurrence of events in the test plan, and report on the progress of the test plan. In recent years, stimuli generation technology has shifted towards constraint-based modeling of the generation task, coupled with stimuli generation schemes driven by solving constraint satisfaction problems (CSPs).

The validity and quality of the stimuli, along with test specification requirements, are naturally modeled through constraints. For a CSP to drive stimuli generation, the stimuli, or its building blocks, are modeled as constraint networks. A random stimuli generator can, therefore, be viewed as a special purpose CSP solver.

A CSP is defined by a set of variables and constraints. Each variable has a set of values as a domain. Each constraint is expressed as a relation, defined over some subset of the variables, denoting valid combinations of their values. A solution to the CSP is found based on an assignment of a single value to each variable that satisfies all of the defined constraints. The constraints can be defined as hard or soft constraints. For a solution to be valid, all hard constraints must be satisfied, but a soft constraint may or may not be satisfied.

Soft constraints can thus be used to relax certain system requirements that may not be "necessary" to a solution, thereby allowing for generation of a higher quality solution set by the CSP solver. Some solutions in the set satisfy all constraints (hard or soft), while other solutions satisfy all the hard constraints but not all the soft constraints. As such, instead of defining all constraints as hard constraint, a user can define certain constraints as soft constraint to enhance the quality of the solutions generated.

To enhance the quality of the solutions, a CSP solver is configured to satisfy as many soft constraints as possible, according to a certain hierarchy or success rate. That is, the solution process can be biased towards higher quality solutions that meet one or more probabilistic requests. A probabilistic request (hereafter "PR") can be submitted by a user to define that one or more soft constraints are to be satisfied in a predefined percentage of the generated solutions. Thus, the PRs ensures that the randomness in not lost in the solution process.

Advantageously, defining a PR allows for a larger variety of solutions, since it allows the user to soften the requirements from the generated stimuli. Unfortunately, however, it is usually extremely difficult to identify whether the generated stimuli conforms to a PR. This, in large part, is attributed to the intricate relationship between the PRs and the soft constraints.

Systems and methods are needed to address the above-mentioned shortcomings by giving the user an indication of the solution's compliance with the user defined PRs.

SUMMARY

The present disclosure is directed to a system and corresponding methods that facilitate determining the conformance rate of solutions generated by a constraint satisfaction problem (CSP) solver to a probabilistic request (PR).

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for determining compliance of one or more solutions with a probabilistic request submitted for solving a constraint satisfaction problem (CSP) is provided. The CSP is defined by one or more variables and constraints such that the constraints define limitations for values that can be assigned to each variable in a given domain to solve the CSP.

The method comprises associating a first probabilistic request with a first constraint, wherein the first probabilistic request indicates that the first constraint is to be satisfied in a predefined percentage of the solutions; processing a first solution to determine whether the first constraint is satisfied by the first solution; and incrementing a success counter for the first probabilistic request, in response to determining that the first constraint is satisfied by the first solution.

In one embodiment, the method further comprises incrementing a failure counter for the first probabilistic request, in response to determining that the first constraint is not satisfied by the first solution. Preferably, the failure counter for a second probabilistic request associated with the first constraint is incremented, in response to determining that the first constraint is irrelevant to the first solution.

The conformance rate for the first probabilistic request is then reported based on value of the success/failure counter. In a preferred embodiment, success/failure results for the probabilistic requests are aggregated over multiples solutions to determine whether the respective soft constraints are satisfied in a predefined percentage of the solutions, as intended by the submitted PRs.

In accordance with another embodiment, a system for determining compliance of one or more solutions with a probabilistic request submitted for solving a constraint satisfaction problem (CSP) is provided. The system comprises a logic unit for associating a first probabilistic request with a first constraint, wherein the first probabilistic request indicates that the first constraint is to be satisfied in a predefined percentage of the solutions.

The system may further comprise a logic unit for processing a first solution to determine whether the first constraint is satisfied by the first solution; and a logic unit for incrementing a success counter for the first probabilistic request, in response to determining that the first constraint is satisfied by the first solution.

In accordance with yet another embodiment, a computer program product comprising a computer useable medium having a computer readable program is provided. The computer readable program when executed on a computer causes the computer to associate a first probabilistic request with a first constraint.

The computer readable program may also cause the computer to process a first solution to determine whether the first constraint is satisfied by the first solution; and increment a success counter for the first probabilistic request, in response to determining that the first constraint is satisfied by the first solution. A failure counter for the first probabilistic request may be also incremented, in response to determining that the first constraint is not satisfied by the first solution.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION

The present disclosure is directed to systems and corresponding methods that facilitate solving a constraint satisfaction problem (CSP) defined by one or more variables, constraints and probabilistic requests (PRs) associated with the constraints. The constraints define limitations for values that can be assigned to each variable in a given domain for the purpose of finding a solution to the CSP. A PR defines in what percentage of solutions a constraint should be satisfied.

In one embodiment, each PR is mapped onto a set of constraints that implement the PR. The CSP solver then finds a series of solutions to the CSP. For each solution, if a constraint associated with a PR is satisfied, then a success counter for that PR is incremented; else a failure counter for that PR is incremented. If the constraint was not considered for the purpose of solving the CSP, then the failure counter for the PR associated with the constraint is incremented.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
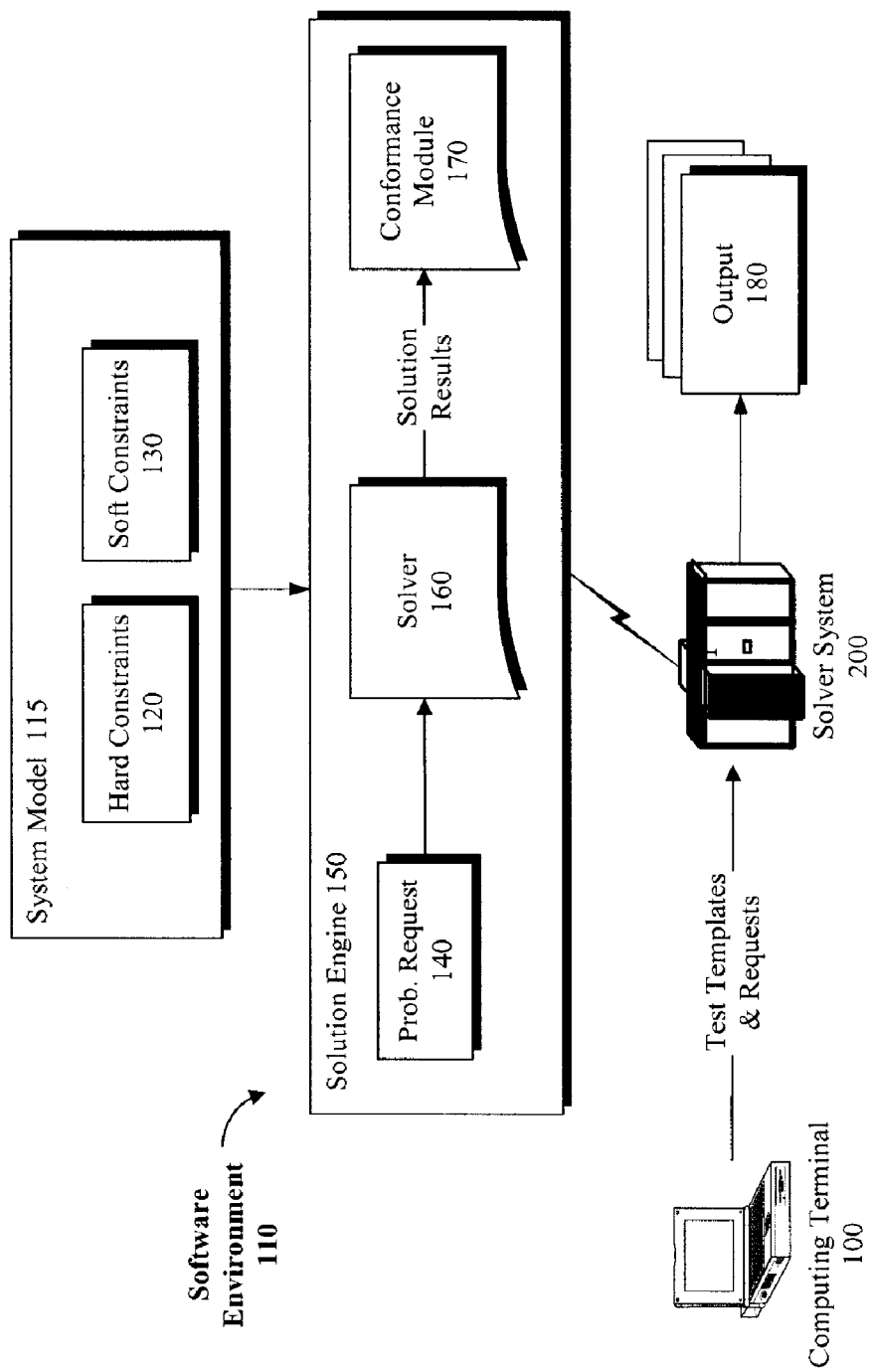
FIG. 1 illustrates an exemplary computing environment in accordance with one or more embodiments of the invention, wherein a constraint satisfaction problem (CSP) can be solved.

Referring to FIG. 1, a solver system 200 and the related software environment 110 for solving a CSP are illustrated, in accordance with an embodiment of the invention. Solver system 200 is built around a solution engine 150, which analyzes a system model 115. System model 115 defines a CSP and a specific set of test requirements to be applied to the CSP.

The system model 115, in one embodiment, is expressed in terms of a set of variables and a network of constraints (e.g., hard constraints 120, soft constraints 130) applicable to those variables. Certain test requirements, such as additional constraints, domain limitations or probabilistic requests (PRs) 140 may be inputted to the system by a computing system or an end user. The test requirements may be inputted in various forms (e.g., test templates).

The solution engine 150 finds one or more solutions to the CSP by assigning different values to each variable within the context of hard constraints 120 and the corresponding PRs 140 submitted for each soft constraint 130. In other words, each solution found by solution engine 150 is a random concrete solution to the CSP, given values of the variables that satisfy all hard constraints 120 and some soft constraints 130, in compliance with PRs 140.

In one embodiment, solver system 200 comprises a general-purpose or dedicated computer, programmed with suitable software, such as software environment 110 to carry out the operations described in more detail below. Software environment 110 is executed on the solver system's 200 hardware environment and may be provided and installed in electronic form, over a network communication link, or as embedded in tangible media, such as CD-ROM or DVD.

Certain aspects of CSP solver systems are described in U.S. patent application Ser. No. 09/788,152, filed Feb. 16, 2001 (published as US 2002/0169587 A1), the content of which is incorporated herein by reference in entirety. A person skilled in the related art would appreciate that although the exemplary embodiments provided here are disclosed as applicable to a CSP solver for verification of a system's design, the principles of the present invention may be applied in solving a wide range of constraint satisfaction problems.

In one embodiment software environment 110 comprises system model 115 and solution engine 150 that are adapted, either in the configuration of a stand-alone computer or integrated with other input and output devices to carry out substantially any operation that can be associated with a constraint network.

Figure 2:
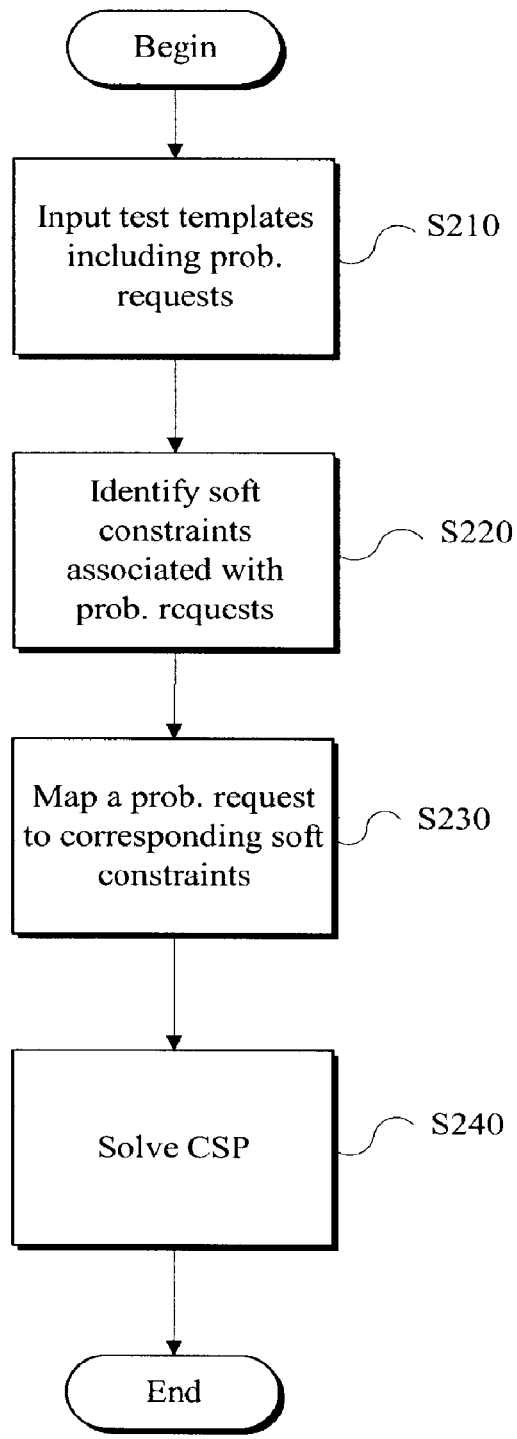
FIG. 2 is a flow diagram of a method for processing constraints and probabilistic requests for a CSP, in accordance with one embodiment.

Referring to FIGS. 1 and 2, one or more system users can interact with a computing terminal 100 coupled to solver system 200, over a network for example, to provide input in the form of test templates and PRs 140 (S210). In an exemplary embodiment, a solver 160 is a part of solution engine 150 and is used to generate a variety of solutions for a CSP based on the information provided in the test templates and PRs 140. Advantageously, a PR 140 allows a user to relax certain constraints (e.g., soft constraints 130) to permit a larger variety of valid solutions to be generated for the CSP.

For example, consider a CSP for a translation table defined by RA=trans (EA), where EA stands for the effective address and RA stands for the physical address. A user may submit a PR for a constraint that, for example, requires several load and store instructions to access the same cache line, thus causing contention on resources shared between different processors. The user may submit a PR for a constraint such that, for example, the boundary page in 50% of the accesses is crossed.

To solve a CSP, solver 160 runs a series of tests by assigning various values to the CSP variables and determining whether the variable values are consistent with the set of constraints and PRs 140 defined in system model 155 and the test templates. In an exemplary embodiment, prior to solver 160 attempting to solve the CSP, each constraint (e.g., soft constraint 130) associated with a PR 140 is identified and mapped to the corresponding PR 140 (S220, S230).

For example, in the context of generating transfers for a hardware system, a first probabilistic request (e.g., PR1) can define the desired success rate of a "page cross" at 80%. Thus, in accordance with one embodiment of the invention, PR1 is mapped to, for example, a first soft constraint (SC1) that limits the value assigned to an "Address" variable in the CSP so that 80% of the solutions satisfy SC1.

In the same context, a second probabilistic request (PR2) can define, for example, the success rate of "collision on accesses" at 70%. PR2 is accordingly mapped to, for example, second and third soft constraints (SC2, SC3), wherein SC2 limits the value of the "Address" variable to an address value near a previously generated access; and SC3 limits the value of a "Length" variable to be long enough to collide with previously generated accesses.

The logical mapping or association between each soft constraint 130 and PR 140 may be recorded in a data structure stored on a storage medium coupled to solver system 200, for example. Table 1 illustrates an exemplary presentation of a data structure in the form of a look-up table. It is noteworthy that the invention is not to be construed as limited to the exemplary presentation in Table 1. Other data structures that can be used to achieve the same purpose may be implemented in form of data delimited files, B-Trees, data arrays, data records, stacks, etc.

TABLE 1

|      | SC 1 | SC 2 | SC 3 | SC 4 |
|------|------|------|------|------|
| PR 1 | ★    |      |      |      |
| PR 2 |      | ★    | ★    |      |
| PR 3 | ★    |      | ★    | ★    |
| PR 4 |      | ★    | ★    |      |

As illustrated in Table 1, variable values in an exemplary CSP may be limited by constraints SC1, SC2, SC3 and SC4. For example, probabilistic request PR3 may be submitted by a user to define that SC1 should be satisfied in X % of the solutions, SC3 should be satisfied in Y % of the solutions, and SC4 should be satisfied in Z % of the solutions. PR4 may be submitted to define that SC2 should for example be satisfied in N % of the solutions generated by solver 160, and so on.

Referring to Table 1, the data structure used for mapping the PRs 140 with the respective soft constraints 130 is preferably implemented to record the logical association between each PR 140 and soft constraint 130. In certain embodiments, the data structure in addition to recording the logical associations, also records the desired probability for each soft constraint 130 to be satisfied (i.e., success/failure rate).

Thereafter, solver 160 is run to solve the CSP (S240). If solver 160 succeeds in solving the CSP, at least one solution is reported in form of output 180 by solver system 200. Solver 160 may go through several iterations and solution paths to produce multiple distinct solutions that satisfy the defined constraints and probabilistic requests. In some embodiments, output 180 comprises a trace of the solution process (i.e., paths searched by solver 160) and the success/failure rate for soft constraints 130, for example.

Figure 3:
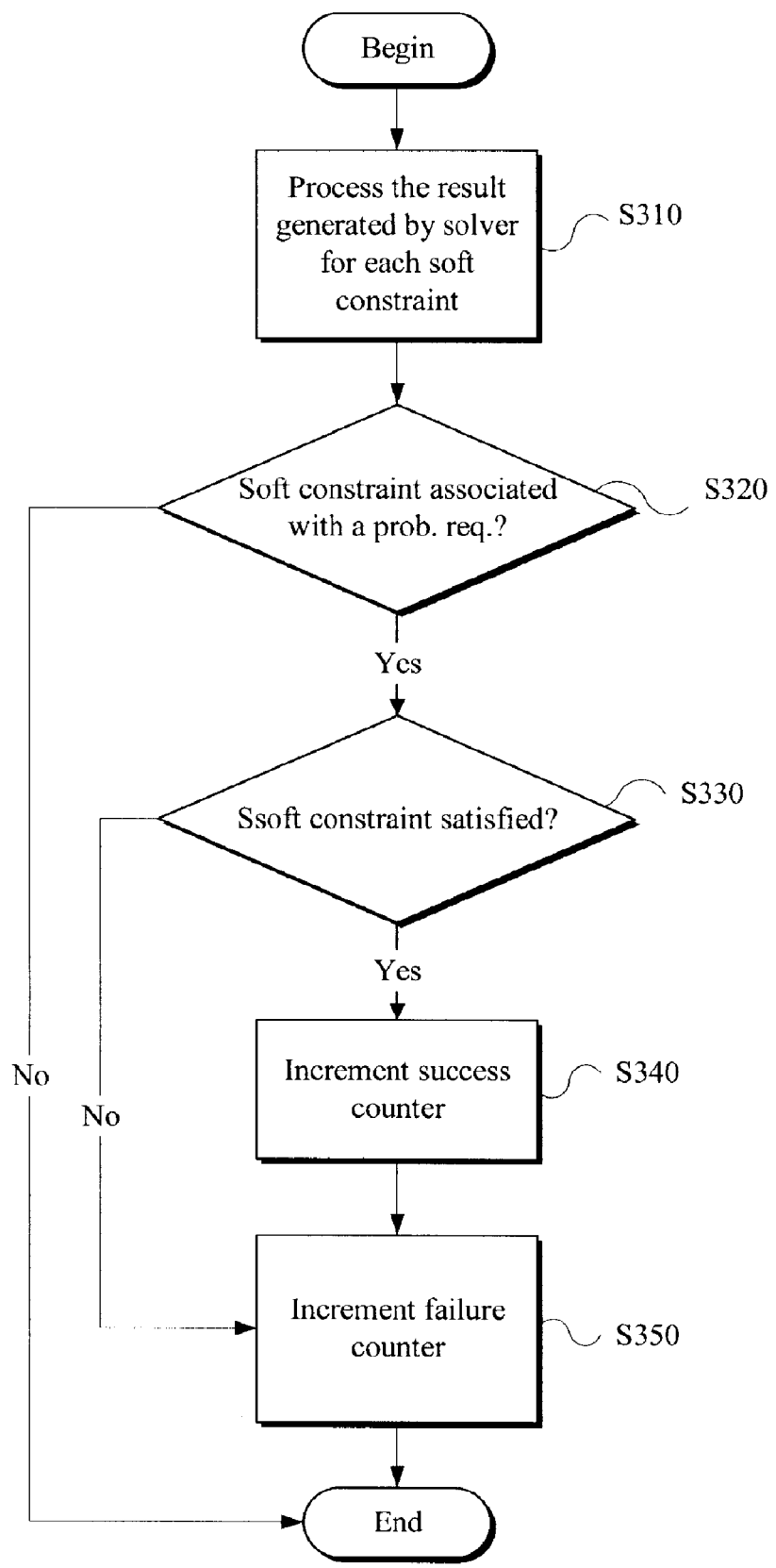
FIG. 3 is a flow diagram of a method of determining the conformance rate of solutions to the probabilistic requests, in accordance with a preferred embodiment.

Referring to FIG. 3, to generate the desired output 180, a conformance module 170 processes the solution results generated by solver 160 for each soft constraint 130 (S310). Conformance module 170 may be a hardware or software component implemented as a part of solution engine 150 to receive solution results from solver 160. In other embodiment, conformance module 170 may be implemented as an integral part of solver 160 without detracting from the scope of the invention.

For each soft constraint 130, conformance module 170 determines if the soft constraint 130 is associated with a PR 140 (S320). In accordance with one embodiment, conformance module 170 refers to a data structure such as that represented by Table 1, for example, to identify the respective PRs 140 for each soft constraint 130. If soft constraint 130 is not associated with any PRs 140, then conformance module 170 moves on to the next soft constraint 130.

For each PR 140, conformance module 170 determines whether the associated soft constraint 130 was satisfied in the generated solution. If so, a success counter for the corresponding PR 140 is incremented (S340). Otherwise, a failure counter for the corresponding PR 140 is incremented (S350). In accordance with one embodiment, if the associated soft constraint 130 was not considered for the purpose of the solution (e.g., due to the probability settings) then the failure counter for the corresponding PR is incremented.

Table 2 is an exemplary representation of a data structure that can be implemented, in accordance with one embodiment, to record the values for success and failure counters for PRs 140. It is noteworthy that the invention is not to be construed as limited to the exemplary presentation in Table 2. Other data structures that can be used to achieve the same purpose may be implemented in form of data delimited files, B-Trees, data arrays, data records, queues, stacks, etc.

TABLE 2

|      | Success | Failure |
|------|---------|---------|
| PR 1 | 2       | 3       |
| PR 2 | 10      | 1       |
| PR 3 | ...     | ...     |

Since a PR 140 can be associated with more than one soft constraint 130, the results generated by conformance module 170 can be either individually reported for each soft constraint 130 or in the aggregate. Furthermore, statistics for the success/failure rate of a PR may be aggregated over multiple sessions of CSP solving for the same PR, so that the results generated by the conformance module 170, preferably, also include information about whether the soft constraints are satisfied as intended and according to the PRs submitted by the user.

Referring to the exemplary output below, solution engine 150 in one embodiment is configured to produce output 180, such that output 180 comprises the number of solutions generated and the success rate for soft constraints 130 in association with their corresponding PR 140.

| Exemplary Output |
| --- |
| =-=-=-=-= <br> Line 15 - Interaction CPU__to__men__PTE__invalidate : <br> Total number of generations: 10 <br> Directive Placement__ActivationProbability - 80% Success <br> Directive Placement__BoundaryWeight - 80% Success <br> Directive Placement__CrossingWeight - 80% Success <br> Directive Placement__VicinityWeight - 80% Success <br> Directive Placement__StoragePartitionTypeWeight - 80% Success <br> Directive Placement__VicinitySize - 80% Success <br> =-=-=-=-= <br> I <br> Line 18 - Interaction CPU__to__men__data__transfer : <br> Total number of generations: 10 <br> Directive Placement__ActivationProbability - 100% Success <br> Directive Placement__BoundaryWeight - 100% Success <br> Directive Placement__CrossingWeight - 100% Success <br> Directive Placement__VicinityWeight - 100% Success <br> Directive Placement__StoragePartitionTypeWeight - 100% Success <br> Directive Placement__VicinitySize - 100% Success |

Accordingly, in an exemplary embodiment, conformance module 170 uses the values of the success or failure counters to report the success or failure rate of each PR 140, the line in the test template in which each PR was included; and the number of solutions generated.

In different embodiments, the invention can be implemented either entirely in the form of hardware or entirely in the form of software, or a combination of both hardware and software elements. For example, solver system 200 may comprise a controlled computing system environment that can be presented largely in terms of hardware components and software code executed to perform processes that achieve the results contemplated by the system of the present invention.

Figure 4A:
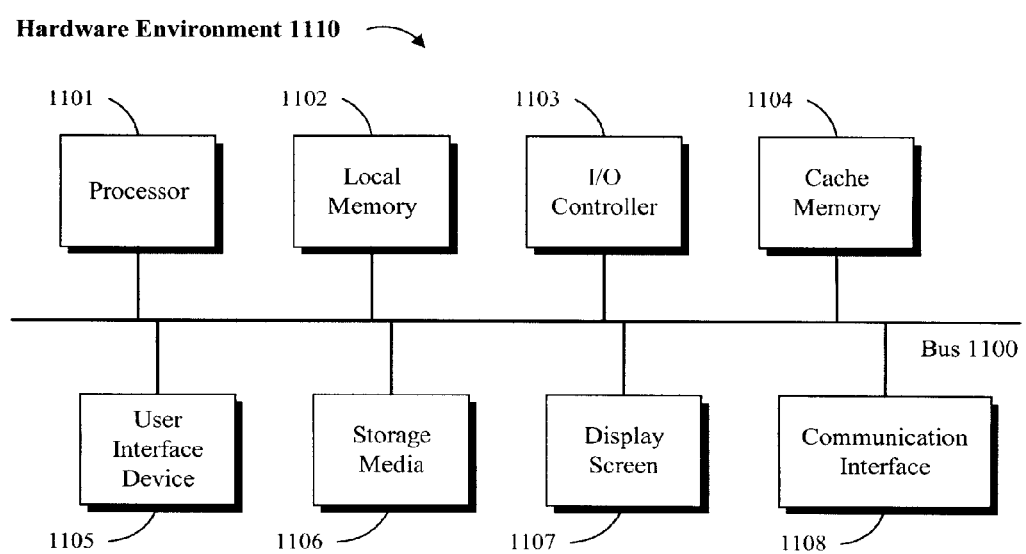
FIGS. 4A and 4B are block diagrams of hardware and software environments in which a system of the present invention may operate, in accordance with one or more embodiments.
Figure 4B:
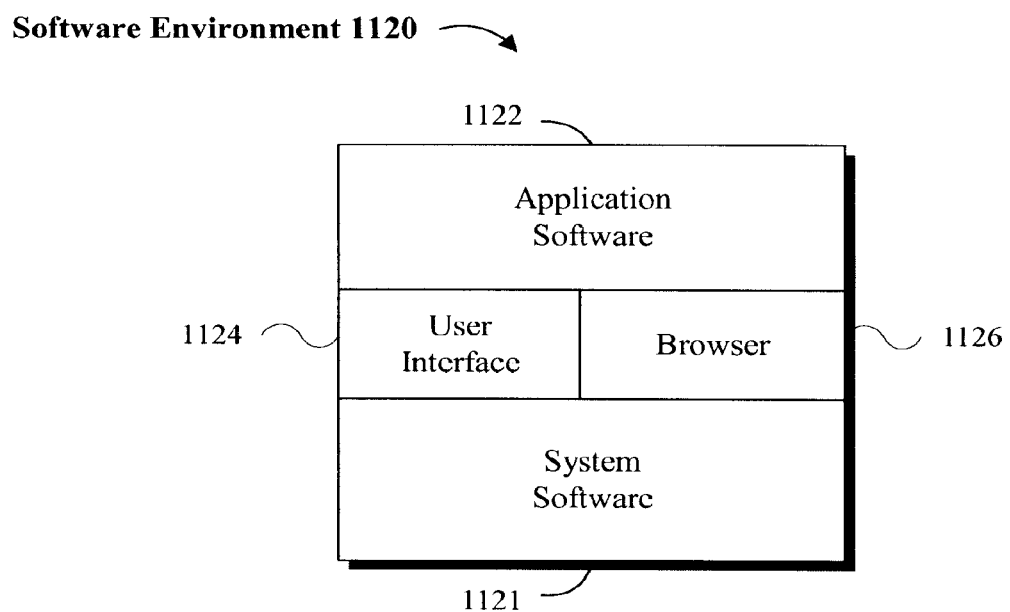

Referring to FIGS. 4A and 4B, a computing system environment in accordance with an exemplary embodiment is composed of a hardware environment 1110 and a software environment 1120. The hardware environment 1110 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. System software 1121 comprises control programs, such as the operating system (OS) and information management systems that instruct the hardware how to function and process information.

In an exemplary embodiment, solution engine 150 is implemented as application software 1122 executed on one or more hardware environments to solve a CSP, as provided earlier. Application software 1122 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 4A, an embodiment of the application software 1122 can be implemented as computer software in the form of computer readable code executed on a data processing system such as hardware environment 1110 that comprises a processor 1101 coupled to one or more memory elements by way of a system bus 1100. The memory elements, for example, can comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 4B, application software 1122 can comprise one or more computer programs that are executed on top of system software 1121 after being loaded from storage media 1106 into local memory 1102. In a client-server architecture, application software 1122 may comprise client software and server software. For example, in one embodiment of the invention, client software is executed on computing terminal 100 and server software is executed on solver system 200.

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps can be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

The present invention has been described above with reference to exemplary features and embodiments. Those skilled in the art will recognize, however, that changes and modifications may be made in these embodiments without departing from the scope of the present invention. These and various other adaptations and combinations of the embodiments disclosed are within the scope of the invention and are further defined by the claims and their full scope of equivalents.

What is claimed is:

1. A computer-implemented method for determining compliance of one or more solutions with a probabilistic request submitted for solving a constraint satisfaction problem (CSP), wherein the CSP is defined by one or more variables and constraints such that the constraints define limitations for values that can be assigned to each variable in a given domain to solve the CSP, the method comprising:
    associating a first probabilistic request with a first constraint, wherein the first probabilistic request indicates that the first constraint is to be satisfied in a predefined percentage of the solutions;
    processing a first solution to determine whether the first constraint is satisfied by the first solution; and
    incrementing a success counter for the first probabilistic request, in response to determining that the first constraint is satisfied by the first solution.

2. The method of claim 1, further comprising incrementing a failure counter for the first probabilistic request, in response to determining that the first constraint is not satisfied by the first solution.

3. The method of claim 2, further comprising incrementing the failure counter for a second probabilistic request associated with the first constraint, in response to determining that the first constraint is irrelevant to the first solution.

4. The method of claim 1, further comprising reporting conformance rate for the first probabilistic request based on value of the success counter.

5. The method of claim 2, further comprising reporting conformance rate for the first probabilistic request based on value of the failure counter.

6. The method of claim 1, wherein value of the success counter is recorded in a data structure.

7. The method of claim 1, wherein value of the failure counter is recorded in a data structure.

8. The method of claim 6, wherein the value of the success counter is used to determine success rate of the first probabilistic request.

9. The method of claim 3, further comprising aggregating success/failure results for the first probabilistic request over multiples solutions to determine whether the first soft constraint is satisfied in said predefined percentage of the solutions.

10. A computer-implemented system for determining compliance of one or more solutions with a probabilistic request submitted for solving a constraint satisfaction problem (CSP), wherein the CSP is defined by one or more variables and constraints such that the constraints define limitations for values that can be assigned to each variable in a given domain to solve the CSP, the system comprising:
    one or more processors communicatively coupled to one or more data storage mediums for processing one or more probabilistic requests;
    a logic unit for associating a first probabilistic request with a first constraint, wherein the first probabilistic request indicates that the first constraint is to be satisfied in a predefined percentage of the solutions;
    a logic unit for processing a first solution to determine whether the first constraint is satisfied by the first solution; and
    a logic unit for incrementing a success counter for the first probabilistic request, in response to determining that the first constraint is satisfied by the first solution.

11. The system of claim 10, further comprising a logic unit for incrementing a failure counter for the first probabilistic request, in response to determining that the first constraint is not satisfied by the first solution.

12. The system of claim 11, further comprising a logic unit for incrementing the failure counter for a second probabilistic request associated with the first constraint, in response to determining that the first constraint is irrelevant to the first solution.

13. The system of claim 10, further comprising a logic unit for reporting conformance rate for the first probabilistic request based on value of the success counter.

14. The system of claim 10, wherein value of the success counter is recorded in a data structure.

15. The system of claim 10, wherein the value of the success counter is used to determine success rate of the first probabilistic request.

16. A computer program product comprising a non-transitory data storage medium having a computer readable program, wherein the computer readable program when executed on a computer causes the computer to:
    associate a first probabilistic request with a first constraint, wherein the first probabilistic request indicates that the first constraint is to be satisfied in a predefined percentage of the solutions;
    process a first solution to determine whether the first constraint is satisfied by the first solution; and
    increment a success counter for the first probabilistic request, in response to determining that the first constraint is satisfied by the first solution.

17. The computer program product of claim 16, wherein the computer readable program when executed on a computer further causes the computer to increment a failure counter for the first probabilistic request, in response to determining that the first constraint is not satisfied by the first solution.

18. The computer program product of claim 17, wherein the computer readable program when executed on a computer further causes the computer to increment the failure counter for a second probabilistic request associated with the first constraint, in response to determining that the first constraint is irrelevant to the first solution.

19. The computer program product of claim 16, wherein the computer readable program when executed on a computer further causes the computer to report conformance rate for the first probabilistic request based on value of the success counter.

20. The computer program product of claim 18, wherein the computer readable program when executed on a computer further causes the computer to aggregate success/failure results for the first probabilistic request over multiples solutions to determine whether the first soft constraint is satisfied in said predefined percentage of the solutions.

* * * * *